US012154507B2

(12) United States Patent
Li

(10) Patent No.: US 12,154,507 B2
(45) Date of Patent: Nov. 26, 2024

(54) DISPLAY PANEL, AND DISPLAY DRIVING METHOD AND DISPLAY DRIVING CIRCUIT FOR THE SAME

(71) Applicant: Xiamen Tianma Micro-Electronics Co., Ltd., Xiamen (CN)

(72) Inventor: Jieliang Li, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/360,750

(22) Filed: Jul. 27, 2023

(65) Prior Publication Data

US 2023/0368738 A1 Nov. 16, 2023

Related U.S. Application Data

(63) Continuation of application No. 17/807,868, filed on Jun. 21, 2022, now Pat. No. 11,741,899, which is a continuation of application No. 16/989,895, filed on Aug. 11, 2020, now Pat. No. 11,417,276.

(30) Foreign Application Priority Data

May 29, 2020 (CN) ......................... 202010472821.0

(51) Int. Cl.
*G09G 3/3241* (2016.01)
*G09G 3/3266* (2016.01)

(52) U.S. Cl.
CPC ......... *G09G 3/3241* (2013.01); *G09G 3/3266* (2013.01); *G09G 2310/027* (2013.01); *G09G 2320/0626* (2013.01)

(58) Field of Classification Search
CPC ............... G09G 3/3241; G09G 3/3266; G09G 2310/027; G09G 2320/0626
See application file for complete search history.

(56) References Cited

U.S. PATENT DOCUMENTS

2020/0082768 A1* 3/2020 Oh ....................... G09G 3/3291

* cited by examiner

*Primary Examiner* — Nelson M Rosario
*Assistant Examiner* — Scott D Au
(74) *Attorney, Agent, or Firm* — KILPATRICK TOWNSEND & STOCKTON LLP

(57) ABSTRACT

A display panel, a display driving method and a display pixel driving circuit therefor are provided. In the display driving method, the light emitting signal includes multiple pulse signals, and the variation trend of the pulse-off durations of the pulse signals is consistent with the variation trend of the light emitting brightness of the light emitting element during the light emitting period, that is, the pulse-off durations decreases sequentially with the decrease of the light emitting brightness of the light emitting element, or sequentially increases with the increase of the light emitting brightness of the light emitting element. Therefore, the flicker problem in the display panel when emitting light can be solved, and improving the image display quality.

28 Claims, 14 Drawing Sheets

DISPLAY PANEL, AND DISPLAY DRIVING METHOD AND DISPLAY DRIVING CIRCUIT FOR THE SAME

The present application is a continuation of U.S. patent application Ser. No. 17/807,868, filed Jun. 21, 2022, which is a continuation of U.S. patent application Ser. No. 16/989,895, filed on Aug. 11, 2020 and issued on Aug. 16, 2022 with U.S. Pat. No. 11,417,276, which claims priority to Chinese Patent Application No. 202010472821.0, titled "DISPLAY PANEL, AND DISPLAY DRIVING METHOD AND DISPLAY DRIVING CIRCUIT FOR THE SAME", filed on May 29, 2020 with the China National Intellectual Property Administration, both of which are incorporated herein by reference in their entireties.

FIELD

The present disclosure relates to the field of display devices, and in particular to a display panel, as well as a display driving method and a display driving circuit for the display panel.

BACKGROUND

With the development of science and technology, electronic devices with display functions are widely used in people's daily life and work, which provide great convenience to people's daily life and work and have become indispensable and important tools for people today.

The display panel is a main component for realizing the display function of an electronic device. At present, organic Light-Emitting Diode (OLED) display panels are mainly used in the electronic devices.

The OLED display panel includes multiple pixels. In the OLED display panel, it is required to scan the pixels line by line at a predetermined scan frequency to provide light emitting signals for the pixels, to enable the organic light-emitting diode in the pixel to emit light. According to the conventional technology, a flicker problem will be caused when the OLED display panel is driven to emit light, which affects the image display quality of the OLED display panel.

SUMMARY

In view of this, a display panel, and a display driving method and a display driving circuit for the display panel are provided according to the present disclosure.

According to the present disclosure, a display driving method for a display panel is provided. The display panel includes pixel units, and the pixel unit includes a pixel circuit. The pixel circuit includes at least: a light emitting element, a drive transistor, and a first control device. The light emitting element is configured to emit light based on a driving current. The drive transistor is configured to supply the driving current to the light emitting element. The first control device is configured to control a conduction state of a path between the drive transistor and the light emitting element in response to a light emitting signal. The display driving method includes: providing the pixel circuit with the light emitting signal to enable the light emitting element in the pixel circuit to emit light. During a light emitting period of an update cycle, a picture update cycle or a data signal update cycle of the light emitting signal, the light emitting signal includes at least one pulse signal, the at least one pulse signal has a pulse-off duration and a pulse-on duration, and a variation trend of pulse-off durations of the plurality of pulse signals is consistent with a variation trend of light emitting brightness of the light emitting element.

It can be seen that, different from the conventional display driving method, in the display driving method according to the present disclosure, the variation trend of the pulse-off durations of the pulse signals is consistent with the variation trend of the light emitting brightness of the light emitting element during the light emitting period, that is, the pulse-off durations decreases sequentially with the decrease of the light emitting brightness of the light emitting element or sequentially increases with the increase of the light emitting brightness of the light emitting element. Therefore, the flicker problem in the display panel when emitting light can be solved, and improving the image display quality.

According to the present disclosure, a display driving circuit for a display panel is further provided. The display panel includes pixel units, and the pixel unit includes a pixel circuit. The pixel circuit includes at least: a light emitting element, a drive transistor, and a first control device. The light emitting element is configured to emit light based on a driving current. The drive transistor is configured to supply the driving current to the light emitting element. The first control device is configured to control a conduction state of a path between the drive transistor and the light emitting element in response to a light emitting signal.

The display driving circuit includes a light emitting driver. The light emitting driver is configured to provide the pixel circuit with the light emitting signal to enable the light emitting element in the pixel circuit to emit light. The light emitting signal multiple update cycles, and during a light emitting period of an update cycle, a picture update cycle or a data signal update cycle of the light emitting signal, the light emitting signal includes at least one pulse signals, the at least one pulse signal has a pulse-off duration and a pulse-on duration, and a variation trend of pulse-off durations of the plurality of pulse signals is consistent with a variation trend of light emitting brightness of the light emitting element.

The display driving circuit according to the present disclosure may be configured to perform the above display driving method, to solve the flicker problem in the display panel when emitting light, and improving the image display quality.

According to the present disclosure, a display driving method for a display panel is further provided. The display panel includes pixel units, and the pixel unit includes a pixel circuit, the pixel circuit includes: a light emitting element configured to emit light based on a driving current, a drive transistor configured to supply a driving current to the light emitting element, and a first control device configured to control a conduction state of a path between the drive transistor and the light emitting element in response to a light emitting signal. The display driving method includes: providing the pixel circuit with the light emitting signal, to enable the light emitting element in the pixel circuit to emit light, where during a light emitting period of an update cycle, a picture update cycle or a data signal update cycle of at least one of the pixel units, the light emitting signal includes at least one pulse signal, the at least one pulse signal has a pulse-off duration and a pulse-on duration, a data signal remains unchanged, and a variation trend of pulse-off durations of the plurality of pulse signals is consistent with a variation trend of light emitting brightness of the light emitting element.

According to the present disclosure, display driving circuit for a display panel is further provided. The display panel includes pixel units, and the pixel unit includes a pixel circuit, the pixel circuit includes: a light emitting element configured to emit light based on a driving current, a drive transistor configured to supply a driving current to the light emitting element, and a first control device configured to control a conduction state of a path between the drive transistor and the light emitting element in response to a light emitting signal. The display driving circuit includes a light emitting driver configured to provide the pixel circuit with the light emitting signal, to enable the light emitting element in the pixel circuit to emit light, where during a light emitting period of an update cycle, a picture update cycle or a data signal update cycle of at least one of the pixel units, the light emitting signal includes at least one pulse signal, the at least one pulse signal has a pulse-off duration and a pulse-on duration, a data signal remains unchanged, and a variation trend of pulse-off durations of the plurality of pulse signals is consistent with a variation trend of light emitting brightness of the light emitting element.

According to the present disclosure, a display panel is further provided. The display panel includes pixel units and the above display driving circuit. At least one of the pixel units includes a pixel circuit. The pixel circuit includes at least: a light emitting element, a drive transistor, and a first control device. The light emitting element is configured to emit light based on a driving current. The drive transistor is configured to supply the driving current to the light emitting element. The first control device is configured to control conduction states of the drive transistor and the light emitting element in response to a light emitting signal.

The display panel according to the present disclosure includes the above display driving circuit, which may be configured to perform the above display driving method, to solve the flicker problem in the display panel when emitting light, and improving the image display quality.

BRIEF DESCRIPTION OF THE DRAWINGS

The drawings to be used in the description of the embodiments are described briefly as follows, according to the embodiments of the present disclosure. It is apparent that the drawings in the following description only illustrate some embodiments of the present disclosure.

The structure, proportion, and size shown in the drawings of the specification are only used to match the contents disclosed in the specification. Any modification of structure, change of proportional relationship, or adjustment of size should still fall within the scope of the embodiments disclosed in the present disclosure without affecting the efficacy and purpose of the present disclosure.

DETAILED DESCRIPTION OF THE EMBODIMENTS

The technical solutions according to the embodiments of the present disclosure are described clearly and completely in conjunction with the drawings hereinafter. It is apparent that the described embodiments are only a few rather than all of the embodiments according to the present disclosure.

The pixel unit of a display panel includes a pixel circuit. The pixel circuit includes multiple thin film transistors. The pixel circuit is configured to drive a light emitting element to emit light in response to a scan signal and a light emitting signal. The light emitting element is an organic light-emitting diode (OLED).

The scan signal and the light emitting signal each includes multiple pulse signals. In a conventional driving method, the scan signal and the light emitting signal both have a frequency of 60 Hz. It is found that power consumption can be reduced by reducing the frequency of the scan signal, such as by reducing the frequency of the scan signal to 1 Hz. However, the frequency of the scan signal is smaller than the frequency of the light emitting signal, if a difference between the two frequencies is large, a serious flicker problem may be caused in the display panel emitting light. If the scan signal and the light emitting signal have the same frequency, or the difference between frequencies of the two is small, for example, both the scan signal and the light emitting signal have a frequency of 60 Hz, no flicker problem will be caused in the display panel.

In a display panel, due to influence of a leakage current of the thin film transistor in the pixel circuit, if a to-be-displayed grayscale value of the light emitting element is less than a first threshold, the light emitting brightness of the light emitting element gradually increases with time during the light emitting period; and if the to-be-displayed grayscale value of the light emitting element is greater than a second threshold, the light emitting brightness of the light emitting element gradually decreases with time during the light emitting period. The first threshold is less than the second threshold. If the to-be-displayed grayscale value of the light emitting element is not less than the first threshold and not greater than the second threshold, there is no leakage current or the leakage current is small, and the light emitting brightness of the light emitting element is constant. For different types of display panels, the first threshold is different from the second threshold, and the two thresholds may be determined by performing experimental tests, which are not limited in the present disclosure. In view of the above, the flicker problem may be serious with respect to a large variation of the light emitting brightness of the light emitting element.

Figure 1:
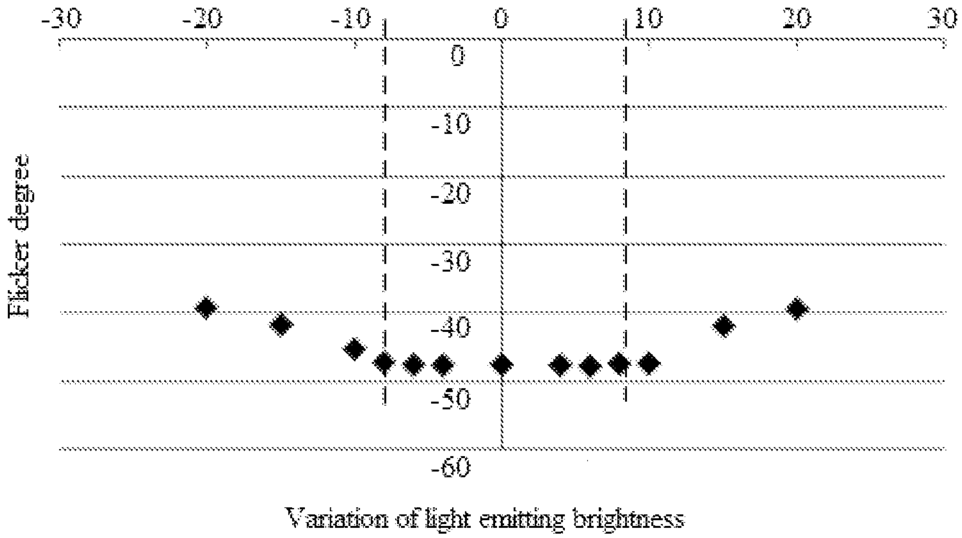
FIG. 1 is a graph showing a flicker degree of a conventional display panel varying with a variation of light emitting brightness of a light emitting element.

Reference is made to FIG. 1, which is a graph showing a flicker degree of a conventional display panel varying with a variation of light emitting brightness of a light emitting element in the conventional display panel. Taking a case that the scan signal has a frequency of 1 Hz and the light emitting signal has a frequency of 60 Hz as an example, in the range between two dashed lines shown in FIG. 1, if the light emitting brightness of the light emitting element is constant, the flicker degree is small and constant; and if the light emitting brightness varies, for example, the light emitting brightness increases or decreases, the flicker degree will increase significantly. Coordinate values on both the horizontal axis and the vertical axis in FIG. 1 are indicated by a unit of dB.

In the conventional driving method, when the light emitting element is driven to emit light, during a light emitting period of an update cycle, the light emitting signal has a constant voltage. In view of this, as shown in FIG. 2, a scheme is provided to solve the flicker problem by changing the waveform of the light emitting signal during the light emitting period.

Figure 2:
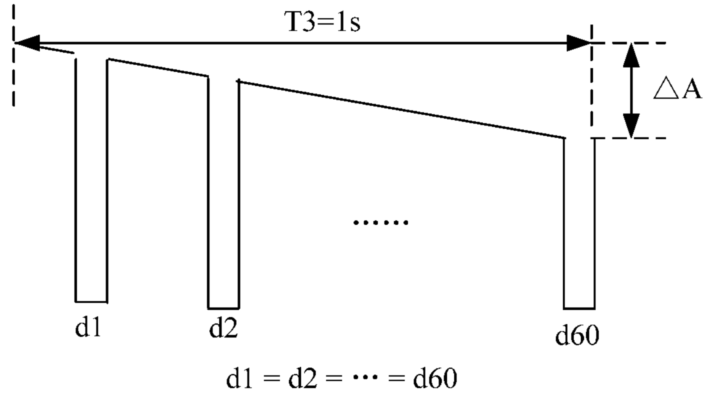
FIG. 2 shows a waveform diagram of a light emitting signal based on a light emitting brightness of a light emitting element.

Reference is made to FIG. 2, which shows a waveform diagram of a light emitting signal based on light emitting brightness of a light emitting element. Taking a case that the scan signal has a frequency of 1 Hz and the light emitting signal has a frequency of 60 Hz as an example, if the light emitting period T3 of the pixel circuit lasts for one second, 60 pulse signals are emitted during the light emitting period T3. Accordingly, there are 60 pulse-on durations and 60 pulse-off durations during the light emitting period T3, which are respectively represented by d1 to d60. In the light emitting period T3, the pulse signals have the same cycle, and have the same pulse-off duration. The light emitting brightness is decreased by ΔA during the light emitting period. A relationship between the flicker degree and a variation of the light emitting brightness may be as shown in FIG. 3.

Figure 3:
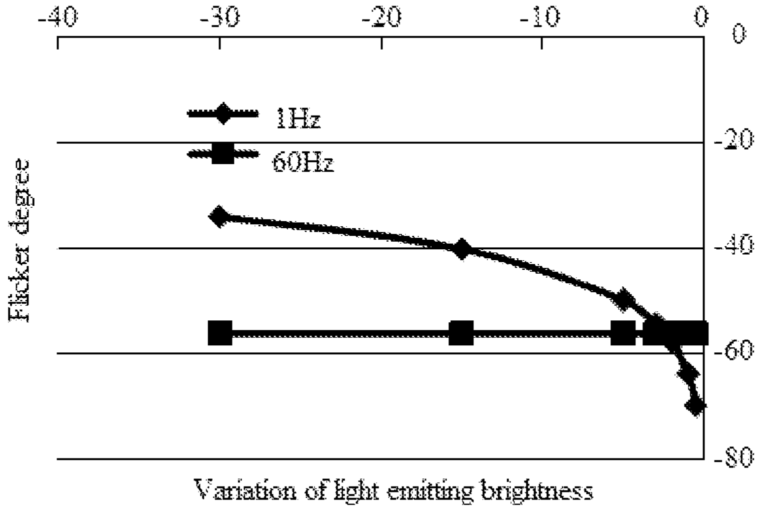
FIG. 3 is a graph showing a flicker degree varying with a variation of light emitting brightness.

Reference is made to FIG. 3, which is a graph showing a flicker degree varying with a variation of light emitting brightness. As the variation of the light emitting brightness increases, in a case that the frequency of the scan signal is 1 Hz, the flicker degree gradually decreases as the light emitting brightness gradually decreases, and in a case that the frequency of the scan signal is 60 Hz, the flicker degree is substantially unchanged as the light emitting brightness decreases. For a display panel having two scan frequencies of 1 Hz and 60 Hz, the flicker degree of the display panel is determined as a maximum flicker degree under the two scan frequencies. It can be seen that if the light emitting brightness attenuates by a variation greater than a fixed value, the flicker degree is mainly determined by the flicker degree in the case that the frequency of the scan signal is 1 Hz, in which case the flicker degree increases with the increase of the variation of the light emitting brightness. The variation of the light emitting brightness depends on the leakage current in the thin film transistor (TFT) and the storage capacitor in the pixel circuit. However, it is difficult to perform parameter design for a TFT which is made from low temperature polysilicon (LTPS) to ensure a small leakage current, so the flicker problem is serious.

To solve the problem, a display driving method is provided according to an embodiment of the present disclosure. The pixel unit of the display panel includes a pixel circuit. The pixel circuit includes at least: a light emitting element, a drive transistor, and a first control device. The light emitting element is configured to emit light based on a driving current. The drive transistor is configured to supply the driving current to the light emitting element. The first control device is configured to control a conduction state of a path between the drive transistor and the light emitting element in response to a light emitting signal. The display driving method includes: providing the pixel circuit with the light emitting signal to enable the light emitting element in the pixel circuit to emit light. In one update cycle, one picture update cycle or one data signal update cycle of the pixel unit, the light emitting signal includes multiple pulse signals during a light emitting period, and during the light emitting period, a variation trend of pulse-off durations is consistent with a variation trend of light emitting brightness of the light emitting element during the update cycle of the pixel unit where the light emitting period is located.

It is to be understood that, in some embodiments, in one picture update cycle or one data signal update cycle, a picture on the display panel remains unchanged. However, in some other embodiments, the data signal corresponding to the display period of a light emitting device in one picture update cycle may remain unchanged or change within an allowed error range.

Different from the conventional display driving method, in the display driving method according to the embodiment of the present disclosure, the variation trend of the pulse-off durations is consistent with the variation trend of the light emitting brightness of the light emitting element during one update cycle of the pixel unit, that is, the pulse-off duration sequentially decreases with the decrease of the light emitting brightness of the light emitting element or sequentially increases with the increase of the light emitting brightness of the light emitting element. Therefore, the flicker problem in the display panel emitting light can be solved, and improving the image display quality.

To make the embodiments of the present disclosure more apparent and easier to be understood, the present disclosure is described in detail in conjunction with the drawings and the embodiments hereinafter.

Figure 4:
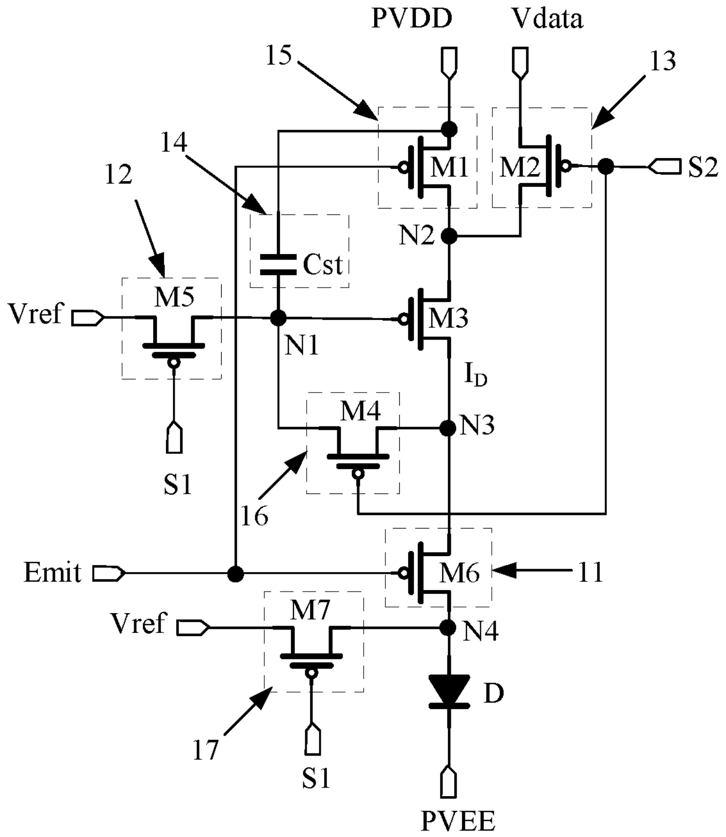
FIG. 4 shows a schematic structural diagram of a pixel circuit according to an embodiment of the present disclosure.

According to an embodiment of the present disclosure, a display driving method is provided, which is applied to a display panel. The display panel is an OLED display panel and includes multiple pixel units. Each of the multiple pixel units includes a pixel circuit as shown in FIG. 4. FIG. 4 shows a schematic structural diagram of a pixel circuit according to an embodiment of the present disclosure.

As shown in FIG. 4, the pixel circuit includes at least: a light emitting element D, a drive transistor M3, and a first control device 11. The light emitting element D is configured to emit light based on a driving current ID. The drive transistor M3 is configured to supply the driving current ID to the light emitting element D. The first control device 11 is configured to control a conduction state of a path between the drive transistor M3 and the light emitting element D in response to a light emitting signal Emit.

A gate of the drive transistor M3 is connected to a node N1, a first electrode of the drive transistor M3 is connected to a node N2, and a second electrode of the drive transistor M3 is connected to a node N3. For example, the drive transistor M3 is a thin film transistor, and a gate of the thin film transistor is connected to the node N1, a first electrode of the thin film transistor is connected to the node N2, and a second electrode of the thin film transistor is connected to the node N3.

The first control device 11 is configured to control a conduction state of a path between the node N3 and a node N4 in response to the light emitting signal Emit inputted to the first control device 11. For example, the first control device 11 includes a thin film transistor M6, a gate of the thin film transistor M6 is supplied with the light emitting signal Emit, a first electrode of the thin film transistor M6 is connected to the node N3, and a second electrode of the thin film transistor M6 is connected to the node N4. The node N4 is connected to a positive electrode of the light emitting element D. A negative electrode of the light emitting element D is supplied with a constant power supply voltage PVEE.

Figure 5:
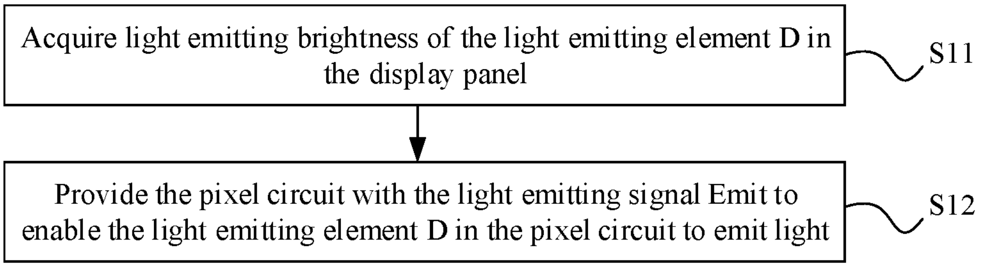
FIG. 5 shows a flow chart of a display driving method according to an embodiment of the present disclosure.

The display driving method according to the embodiment of the present disclosure is shown in FIG. 5. FIG. 5 shows a flow chart of a display driving method according to an embodiment of the present disclosure. The display driving method includes the following steps S11 and S12.

In step S11, light emitting brightness of the light emitting element D in the display panel is acquired.

In step S12, the pixel circuit is provided with the light emitting signal Emit, to enable the light emitting element D in the pixel circuit to emit light.

Figure 6:
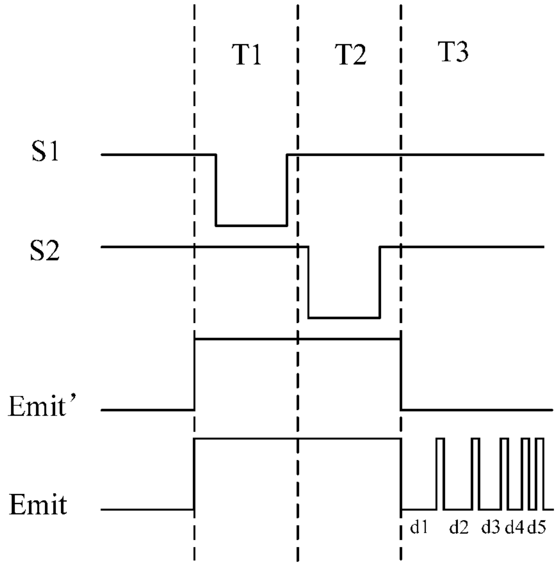
FIG. 6 shows a timing diagram of a pixel circuit according to an embodiment of the present disclosure.

Reference is made to FIG. 6, which shows a timing diagram of a pixel circuit according to an embodiment of the present disclosure. In one update cycle of the pixel unit, the light emitting signal Emit includes multiple pulse signals during a light emitting period T3. During the light emitting period T3, a variation trend of the pulse-off durations is consistent with a variation trend of light emitting brightness of the light emitting element D. As shown in FIG. 6, there are five pulse-off durations d1 to d5 in the light emitting period T3 of the light emitting signal Emit.

In the light emitting period T3, the light emitting signal Emit includes multiple pulse signals. The number of pulse signals during the lighting period T3 may be set based on the driving requirements, which is not limited in the present disclosure. There is a pulse-on duration and a pulse-off duration for each pulse signal. The frequency of the light emitting signal Emit may be set to 60 Hz or 240 Hz. If the frequency of the light emitting signal Emit is 60 Hz, there are 60 update cycles per second for the light emitting signal Emit, and the update cycle includes an initialization period T1, a data writing period T2, and a light emitting period T3. It should be noted that the frequency of the light emitting signal Emit may be set based on a clock period, which is not limited to 60 Hz or 240 Hz, and may be set to have other values.

As shown in FIG. 6, the display driving method according to the embodiment of the present disclosure is different from the conventional display driving method in that, in the conventional display driving method, the light emitting signal Emit' is completely at a low level during the light emitting period, while in the display driving method according to the present disclosure, the light emitting signal Emit includes multiple pulse signals in one update cycle of a pixel unit, and the variation trend of the pulse-off durations is consistent with the variation trend of the light emitting brightness of the light emitting element D, that is, the pulse-off durations decreases sequentially with the decrease of the light emitting brightness of the light emitting element D or sequentially increases with the increase of the light emitting brightness of the light emitting element D. Therefore, the flicker problem in the display panel emitting light can be solved, and improving the image display quality.

Continually, referring to FIG. 6 as well as Figures of FIGS. 7 to 14 that are not contradictory to the following embodiment of the present disclosure, for similarities to the other embodiments of the present disclosure, details will not be repeated. Differently, in one update cycle or one picture update cycle of the pixel unit, the light emitting period T3 of the light emitting signal includes multiple pulses, and in the light emitting period T3, the data signal Vdata remains unchanged, that is, no transition occurs in the data signal Vdata.

As shown in FIG. 4 and FIG. 6, the pixel circuit includes a first reset device 12 and a data writing device 13. The first reset device 12 is configured to reset a voltage of a gate of the drive transistor M3 based on a first scan signal S1 and a reference voltage Vref. The data writing device 13 is configured to transmit a data signal Vdata to a first electrode of the drive transistor M3 based on a second scan signal S2. A second electrode of the drive transistor M3 is used to output the driving current ID. A frequency of the first scan signal S1 and a frequency of the second scan signal S2 are smaller than the frequency of the light emitting signal Emit.

The first reset device 12 is configured to control a conduction state of a path between a terminal at which the reference voltage Vref is inputted and the node N1 in response to the inputted first scan signal S1. For example, the first reset device 12 is a thin film transistor M5, a gate of the thin film transistor M5 is supplied with the first scan signal S1, a first electrode of the thin film transistor M5 is supplied with the reference voltage Vref, and a second electrode of the thin film transistor M5 is connected to the node N1.

The data writing device 13 is configured to control a conduction state of a path between a terminal at which the data signal Vdata is inputted and the node N2 in response to the inputted second scan signal S2. For example, the data writing device 13 is a thin film transistor M2, a gate of the thin film transistor M2 is supplied with the second scan signal S2, a first electrode of the thin film transistor M2 is supplied with the data signal Vdata, and a second electrode of the thin film transistor M2 is connected to the node N2.

As shown in FIG. 4, the pixel circuit further includes a holding device 14, a second control device 15, a threshold compensation device 16, and a second reset device 17.

The holding device 14 is supplied with a constant power supply voltage PVDD. One terminal of the holding device 14 is supplied with the constant power supply voltage PVDD, and the other terminal of the holding device 14 is connected to the node N1. For example, the holding device 14 may be a storage capacitor Cst, one electrode plate of the storage capacitor Cst is supplied with the constant power supply voltage PVDD, another electrode plate of the storage capacitor Cst is connected to the node N1, and the node N1 is connected to a gate of the drive transistor M3.

The second control device 15 is configured to control a conduction state of a path between a terminal at which the constant power supply voltage PVDD is inputted and the first electrode of the drive transistor M3 based on the light emitting signal Emit. The second control device 15 is configured to control a conduction state of a path between a terminal at which the constant power supply voltage PVDD is inputted and the node N2 in response to the inputted light emitting signal Emit. For example, the second control device 15 is a thin film transistor M1, a gate of the thin film transistor M1 is supplied with the light emitting signal Emit, a first electrode of the thin film transistor M1 is supplied with the constant power supply voltage PVDD, a second electrode of the thin film transistor M1 is connected to the node N2, and the node N2 is connected to the first electrode of the drive transistor M3.

The threshold compensation device 16 is configured to control a conduction state of a path between the gate of the drive transistor M3 and the second electrode of the drive transistor M3 based on the second scan signal S2. The threshold compensation device 16 is configured to control a conduction state of a path between the node N1 and the node N3 in response to the inputted second scan signal S2. For example, the threshold compensation device 16 is a thin film transistor M4, a gate of the drive transistor M4 is supplied with the second scan signal S2, a first electrode of the drive transistor M4 is connected to the node N1, a second electrode of the drive transistor M4 is connected to the node N3, and the node N3 is connected to the second electrode of the drive transistor M3.

The second reset device 17 is configured to input a reference voltage Vref to a positive electrode of the light emitting element D based on the first scan signal S1. The second reset device 17 is configured to control a conduction state of a path between a terminal at which the reference voltage Vref is inputted and the node N4 in response to the inputted first scan signal S1. For example, the second reset device 17 is a thin film transistor M7, a gate of the thin film transistor M7 is supplied with the first scan signal S1, a first electrode of the thin film transistor M7 is supplied with the reference voltage Vref, a second electrode of the thin film transistor M7 is connected to the node N4, and the node N4 is connected to the positive electrode of the light emitting element D. A negative electrode of the light emitting element D is supplied with a constant power supply voltage PVEE. The constant power supply voltage PVEE is less than the constant power supply voltage PVDD.

It should be noted that, in the embodiment of the present disclosure, the display driving method is described by taking a 7T1C (that is, 7 thin film transistors and 1 capacitor) pixel circuit as an example. Apparently, the display driving method according to the embodiments of the present disclosure is not limited to applying to the 7T1C pixel circuit as shown in the drawings of the present disclosure. The display driving method may also be applied to 7T1C pixel circuits having other structures, or a pixel circuit including more thin film transistors, or a pixel circuit including fewer thin film transistors.

In an embodiment, both the frequency of the first scan signal S1 and the frequency of the second scan signal S2 may be set to 1 Hz, and the frequency of the light emitting signal Emit may be set to 60 Hz. Apparently, the frequencies of the two scan signals and the frequency of the light emitting signal Emit may be set based on display requirements, which are not limited by the embodiments of the present disclosure. In the embodiments of the present disclosure, the thin film transistors in the pixel circuit are all thin film transistors made from LTPS, so that the flicker problem caused by the leakage current of the LTPS thin film transistor can be efficiently solved.

As shown in FIG. 6, in the pixel circuit, each of the thin film transistors is turned off in response to a high-level signal and is turned on in response to a low-level signal. The update cycle of the pixel unit includes: an initialization period T1, a data writing period T2, and a light emitting period T3.

During the initialization period T1, the light emitting signal Emit is at a high level for controlling the first control device 11 and the second control device 15 to be turned off. The first scan signal S1 is at a low level for controlling the first reset device 12 to be turned on to input the reference voltage Vref to the gate of the drive transistor M3 and to a lower electrode plate of the holding device 14, to reset the voltage of the gate of the drive transistor M3 and the voltage of the lower electrode plate of the holding device 14. In addition, the second reset device 17 is controlled to be turned on in response to the first scan signal S1 of a low level, to input the reference voltage Vref to the positive electrode of the light emitting element D, to reset the voltage of the positive electrode of the light emitting element D, and prevent light leakage of the light emitting element D. In this case, the voltage of the node N1 is equal to the reference voltage Vref. The reference voltage Vref is at a low level.

During the data writing period T2, the light emitting signal Emit is at a high level for controlling the first control device 11 and the second control device 15 to remain in an off state. The first scan signal S1 is at a high level for controlling the first reset device 12 and the second reset device 17 to be turned off. The second scan signal S2 is at a low level for controlling the data writing device 13 and the threshold compensation device 16 to be turned on, thus the voltage of the node N1 is remained at the reference voltage Vref by the holding device 14, so that the drive transistor M3 is turned on, and the voltage of the gate of the drive transistor M3 is increased until the drive transistor M3 is turned off. When the drive transistor M3 is turned off, the voltage of the gate of the drive transistor M3 is equal to Vdata+Vth, where Vth indicates a threshold voltage of the drive transistor M3.

During the light emitting period T3, the first scan signal and the second scan signal are both at a high level for controlling the data writing device 13, the threshold compensation device 16, the first reset device 12, and the second reset device 17 to be turned off. The light emitting signal Emit includes multiple pulse signals, and the pulse signal is at a high level during a pulse-off duration for controlling the first control device 11 and the second control device 15 to be turned off, and the light emitting element does not emit light. The pulse signal is at a low level during a pulse-on duration for controlling the first control device 11 and the second control device 15 to be turned on, and a voltage of the node N2 is equal to the constant power supply voltage PVDD, which is greater than the voltage of the node N1, and the drive transistor M3 is turned on to supply a driving current to the light emitting element D to enable the light emitting element D to emit light. As shown in FIG. 6, different from the conventional display driving method in which the light emitting signal Emit' is a constant low-level signal, in the display driving method according to the embodiment of the present disclosure, the light emitting signal Emit includes multiple pulse signals in the light emitting period T3, and the variation trend of the pulse-off durations is consistent with the variation trend of the light emitting brightness of the light emitting element, and solving the flicker problem caused by the leakage current in the conventional display driving method.

It should be noted that, in the above embodiment, the transistors are all PMOS s for example, in which case the transistors are turned off in response to a high-level signal and are turned on in response to a low-level signal. Apparently, according to the embodiments of the present disclosure, the transistors may be NMOSs, in which case the transistors are turned on in response to a high-level signal and are turned off in response to a low-level signal, and it is only required to adjust the timing sequence of the high levels and low levels of each signal, which is not described herein. In the following embodiment, description is made by taking an example in which the transistors are NMOSs for example.

In an embodiment, the providing the pixel circuit with the light emitting signal includes: if the light emitting brightness of the light emitting element D gradually decreases during the update cycle, providing the pixel circuit with a light emitting signal Emit pulse-off durations of which sequentially decrease during the light emitting period T3. During the light emitting period T3, a pulse-off duration of a pulse signal in the light emitting signal Emit is not less than a pulse-off duration of a subsequent pulse signal in the light emitting signal Emit, and the light emitting signal includes at least two pulse signals with different pulse-off durations.

In another embodiment, the providing the pixel circuit with the light emitting signal includes: if the light emitting brightness of the light emitting element D gradually increases during the update cycle, providing the pixel circuit with a light emitting signal Emit pulse-off durations of which sequentially increase during the light emitting period T3. During the light emitting period T3, a pulse-off duration of a pulse signal in the light emitting signal Emit is not greater than a pulse-off duration of a subsequent pulse signal in the light emitting signal Emit, and the light emitting signal includes at least two pulse signals with different pulse-off durations.

In the above embodiments, during the light emitting period T3, the pulse-off durations may sequentially change. If n pulse signals are included during the light emitting period T3, where n is a positive integer greater than 1, a waveform diagram of the light emitting signal during the light emitting period T3 may be as shown in FIG. 7 and FIG. 8.

Figure 7:
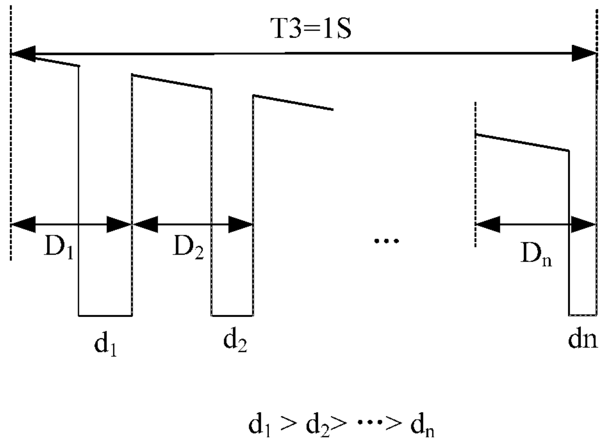
FIG. 7 shows a waveform diagram of a light emitting signal during a light emitting period according to an embodiment of the present disclosure.
Figure 8:
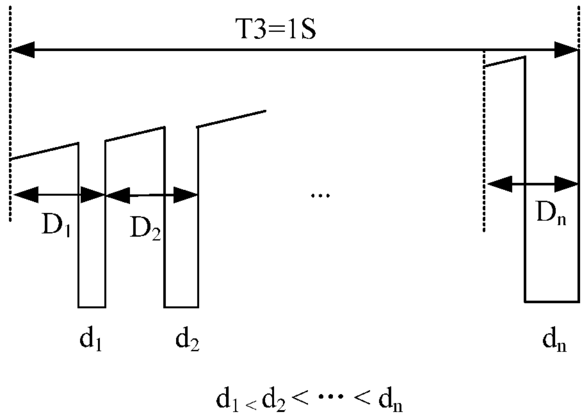
FIG. 8 shows a waveform diagram of a light emitting signal during a light emitting period according to another embodiment of the present disclosure.

Reference is made to FIG. 7, which shows a waveform diagram of a light emitting signal during a light emitting period according to an embodiment of the present disclosure. In the embodiment, the light emitting brightness of the light emitting element D gradually decreases. During the light emitting period T3, the pulse-off durations sequentially decreases. If the pulse-off durations of n pulse signals are sequentially represented by $d_1$ to $d_n$, it can be determined that $d_1>d_2> \dots >d_n$.

In the embodiment shown in FIG. 7, for the multiple pulse signals in the light emitting period T3, cycles of the n pulse signals are sequentially represented by $D_1$ to $D_n$, and pulse-on durations of the n pulse signals are sequentially represented by $D_1-d_1$ to $D_n-d_n$. The variation trend of the pulse-on durations is opposite to the variation trend of the light emitting brightness of the light emitting element D, that is:

$$D_1-d_1<D_2-d_1<D_n-d_n$$

Based on the above expression, the variation trend of the pulse-on durations in the light emitting period T3 is opposite to the variation trend of the light emitting brightness of the light emitting element D, and the pules signals of the light emitting signal Emit during the light emitting period T3 have the same cycles, that is:

$$D_1=D_2= \dots =D_n$$

Reference is made to FIG. 8, which shows a waveform diagram of a light emitting signal during a light emitting period according to another embodiment of the present disclosure. In the embodiment, the light emitting brightness of the light emitting element D gradually increases. During the light emitting period T3, the pulse-off durations sequentially increases, that is, $d_1<d_2< \dots <d_n$.

In the embodiment shown in FIG. 8, for the multiple pulse signals in the light emitting period T3, the variation trend of the pulse-on durations in the light emitting period T3 is opposite to the variation trend of the light emitting brightness of the light emitting element D, so that the light emitting signal Emit during the light emitting period T3 have the same cycle.

In the embodiments shown in FIG. 7 and FIG. 8, in the light emitting period T3, a difference between pulse-off durations of any adjacent pulse signals is set to be constant, that is:

$$d_{i-1}-d_i=d_i-d_{i+1}=\Delta t$$

In the above expression, i represents a positive integer greater than 1 and not greater than n. The difference between the pulse-off durations of any adjacent pulse signals are set to be constant, to facilitate the timing control of the pulse signals in the light emitting period T3. In the embodiment shown in FIG. 7, Δt is an integer. In the embodiment shown in FIG. 8, Δt is a negative number.

In the embodiments shown in FIG. 7 and FIG. 8, the frequency of the scan signal is 1 Hz, and T3=1 s. T3 and n may be set based on requirements, which is not limited in the embodiments of the present disclosure.

In the above embodiments, the light emitting period T3 may include multiple sub-periods. Multiple pulse signals are emitted in each of the sub-periods. The pulse signal has a pulse-on duration and a pulse-off duration. The pulse-off durations in one sub-period are identical to each other, and the pulse-off durations in different sub-periods sequentially change. In the light emitting period T3, the number of sub-periods and the number of pulse signals in each of the sub-periods may be set according to requirements, which is not limited in the embodiments of the present disclosure. The waveform diagram of the light emitting signal during the light emitting period T3 may be as shown in FIG. 9 and FIG. 10.

Figure 9:
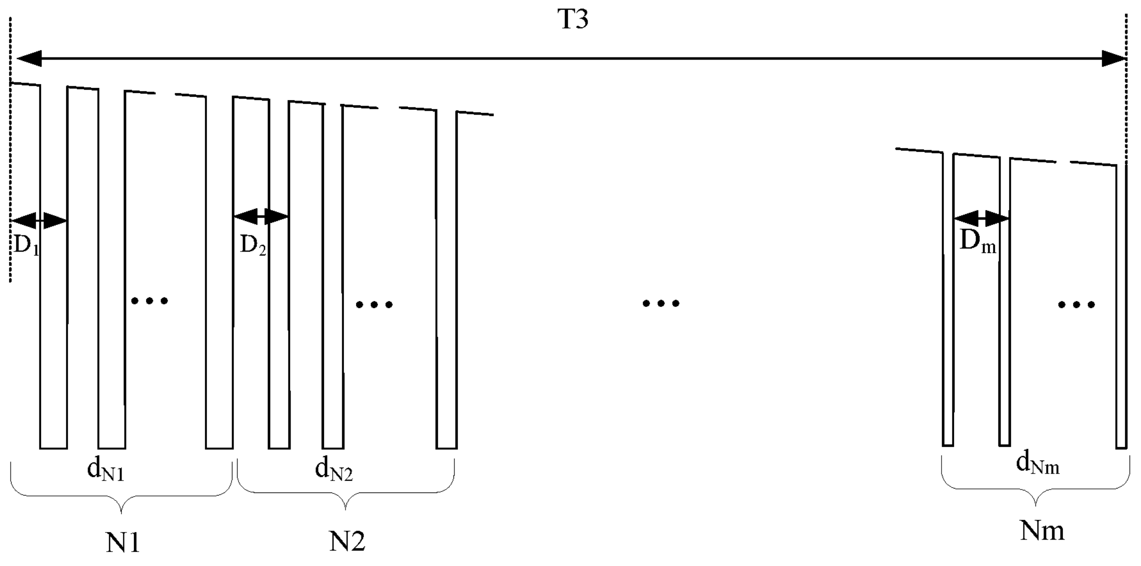
FIG. 9 shows a waveform diagram of a light emitting signal during a light emitting period according to another embodiment of the present disclosure.
Figure 10:
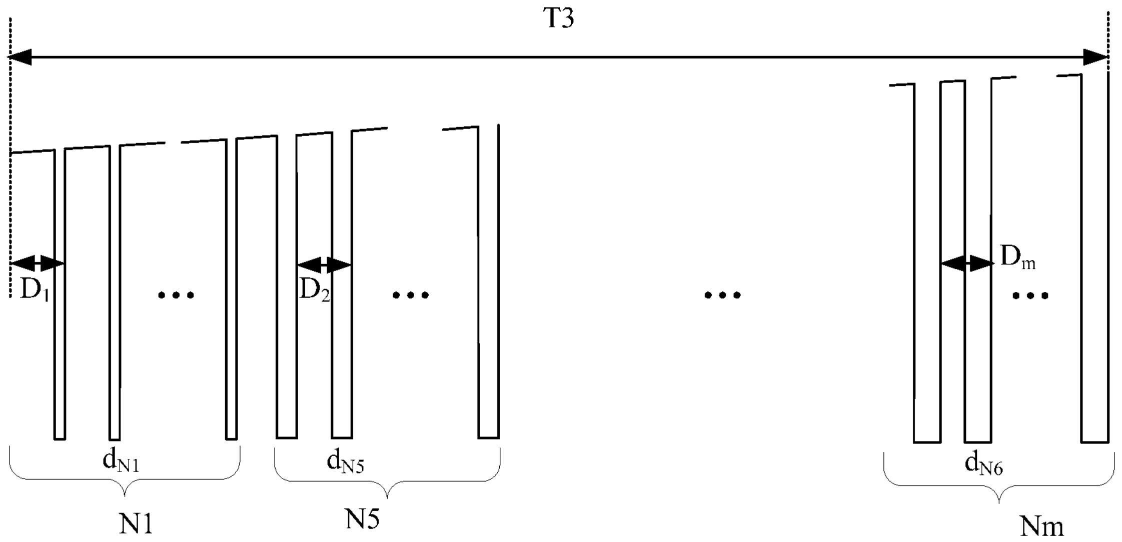
FIG. 10 shows a waveform diagram of a light emitting signal during a light emitting period according to another embodiment of the present disclosure.

Reference is made to FIG. 9, which shows a waveform diagram of a light emitting signal during a light emitting period according to another embodiment of the present disclosure. In the embodiment, the light emitting brightness of the light emitting element D gradually decreases. One light emitting period T3 may include m sub-periods, which are sequentially represented by N1 to Nm. m is a positive integer greater than 1, for example, m may be set to 6. Each of the sub-periods may include the same number of pulse signals, for example, each of the sub-periods includes 10 pulse signals. Any two pulse signals in one sub-period have the same pulse-off duration. Pulse-off durations in different sub-periods sequentially decreases. If pulse-off durations in sub-periods N1 to Nm are respectively represented by $d_{N1}$ to $d_{Nm}$, it may be determined that:

$$d_{N1}>d_{N2}> \dots >d_{Nm}$$

In the embodiment shown in FIG. 9, the pulse-off durations in the same sub-period are identical to each other, and the variation trend of the pulse-off durations in different sub-periods is consistent with the variation trend of the light emitting brightness of the light emitting element D, that is, the pulse-off durations in different sub-periods sequentially decreases. The pulse-on durations in the same sub-period are identical to each other, and the variation trend of the pulse-on durations in different sub-periods is opposite to the variation trend of the light emitting brightness of the light emitting element D, that is, the pulse-on durations in different sub-periods sequentially increases, that is:

$$D_1-d_{N1}<D_2-d_{N2}< \ldots <D_m-d_{Nm}$$

In the above expression, $D_1$ to $D_m$ respectively represent a pulse period in each of the m sub-periods in one light emitting period. If the variation trend of the pulse-off durations in different sub-periods is opposite to the variation trend of the light emitting brightness of the light emitting element D, the pulses in different sub-periods may have the same cycle, that is:

$$D_1=D_2= \ldots =D_m$$

Reference is made to FIG. 10, which shows a waveform diagram of a light emitting signal during a light emitting period according to another embodiment of the present disclosure. In the embodiment, the light emitting brightness of the light emitting element D gradually increases. One light emitting period T3 may include m sub-periods, and the m sub-periods are sequentially represented by N1 to Nm. m is a positive integer greater than 1, for example, m may be set to 6 as shown in FIG. 10. Each of the sub-periods may include the same number of pulse signals, for example, each of the sub-periods includes 10 pulse signals. Any two pulses in the same sub-period may have the same pulse-off duration. Pulse-off durations in different sub-periods sequentially increases. If pulse-off durations in the sub-periods N1 to Nm are respectively represented by $d_{N1}$ to $d_{Nm}$, it may be determined that:

$$d_{N1}<d_{N2}< \ldots <d_{Nm}$$

In the embodiment shown in FIG. 10, the pulse-off durations in the same sub-period are identical to each other, and the variation trend of the pulse-off durations in different sub-periods is consistent with the variation trend of the light emitting brightness of the light emitting element D, that is, the pulse-off durations in different sub-periods sequentially increases. The pulse-on durations in the same sub-period are identical to each other, and the variation trend of the pulse-on durations in different sub-periods is opposite to the variation trend of the light emitting brightness of the light emitting element D, that is, the pulse-on durations in different sub-periods sequentially decreases, that is:

$$D_1-d_{N1}>D_2-d_{N2}> \ldots >D_m-d_{Nm}$$

If the variation trend of the pulse-off durations in different sub-periods is opposite to the variation trend of the light emitting brightness of the light emitting element D, the pulse signals in different sub-periods may have the same cycle.

In the embodiments shown in FIG. 9 and FIG. 10, the light emitting period T3 includes multiple sub-periods. For the light emitting period T3 in which a fixed number of pulse signals are emitted, it is unnecessary to set each of the pulse-off durations separately, and reducing the calculation amount of the controller. The difference between pulse-off durations of any adjacent sub-periods may be set to be constant, that is:

$$d_{Na-1}-d_{Na}=d_{Na}-d_{Na+1}=\Delta t$$

In the above expression, a represents a positive integer greater than 1 and not greater than m. In the embodiment shown in FIG. 9, Δt is an integer. In the embodiment shown in FIG. 10, Δt is a negative number.

As shown in FIG. 7 to FIG. 10, for the multiple pulse signals in the light emitting period T3, the variation trend of the pulse-off durations is consistent with the variation trend of the light emitting brightness of the light emitting element D. If the light emitting brightness of the light emitting element D gradually increases, the pulse-off durations in the light emitting period T3 sequentially increase; and if the light emitting brightness of the light emitting element D gradually decreases, the pulse-off durations in the light emitting period T3 sequentially decrease. For the multiple pulse signals in the light emitting period T3, the variation trend of the pulse-on durations is opposite to the variation trend of the light emitting brightness of the light emitting element D. If the light emitting brightness of the light emitting element D gradually increases, the pulse-on durations in the light emitting period T3 sequentially decrease; and if the light emitting brightness of the light emitting element D gradually decreases, the pulse-on durations in the light emitting period T3 sequentially increase. Therefore, the pulse signal of the light emitting signal Emit during the light emitting period T3 have the same cycle.

In other embodiments, for the multiple pulse signals in the light emitting period T3, the variation trend of the pulse-off durations is consistent with the variation trend of the light emitting brightness of the light emitting element D. If the light emitting brightness of the light emitting element D gradually increases, the pulse-off durations in the light emitting period T3 sequentially increase; and if the light emitting brightness of the light emitting element D gradually decreases, the pulse-off durations in the light emitting period T3 sequentially decrease. For the multiple pulse signals in the light emitting period T3, the pulse-on durations are constant. Therefore, the variation trend of the cycles of pulse signals in the light emitting signal Emit in the light emitting period T3 is consistent with the variation trend of the light emitting brightness of the light emitting element.

If the variation trend of the cycles of pulse signals in the light emitting signal Emit during the light emitting period T3 is consistent with the variation trend of the light emitting brightness of the light emitting element, it is unnecessary to change the pulse-on duration. In the light emitting period T3, the pulse-on durations are identical to each other, and it is unnecessary to change the pulse-on durations. In this case, the waveform diagram of the light emitting signal Emit during the light emitting period T3 may be as shown in FIG. 11 to FIG. 14.

Figure 11:
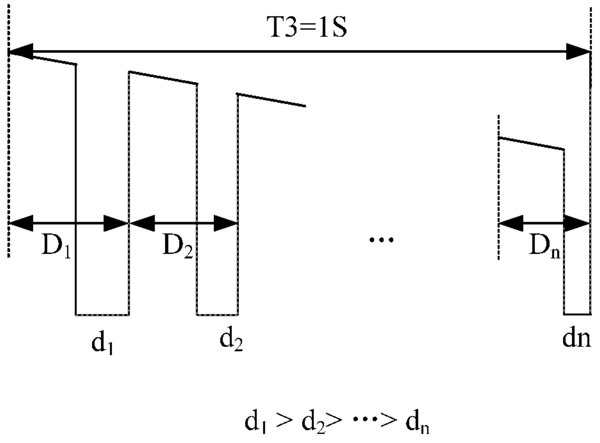
FIG. 11 shows a waveform diagram of a light emitting signal during a light emitting period according to another embodiment of the present disclosure.

Reference is made to FIG. 11, which shows a waveform diagram of a light emitting signal during a light emitting period according to another embodiment of the present disclosure. In the embodiment, the light emitting brightness of the light emitting element D gradually decreases, and the pulse-off durations in the light emitting period sequentially decrease. The embodiment shown in FIG. 11 differs from the embodiment shown in FIG. 7 in that, for the multiple pulse signals in the light emitting period T3, the pulse-on durations are constant, so that the cycles of the pulse signals sequentially decrease, that is:

$$D_1-d_1=D_2-d_2= \ldots =D_n-d_n$$

$$D_1>D2> \ldots >D_n$$

Figure 12:
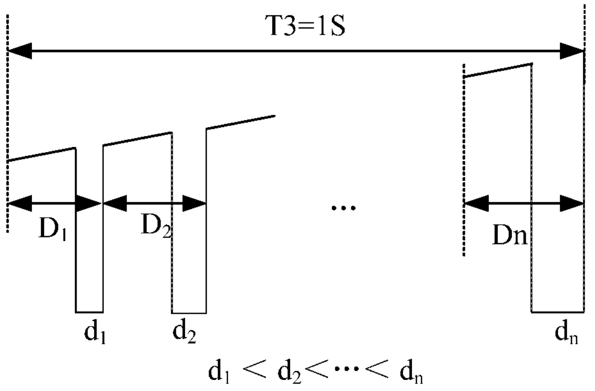
FIG. 12 shows a waveform diagram of a light emitting signal during a light emitting period according to another embodiment of the present disclosure.

Reference is made to FIG. 12, which shows a waveform diagram of a light emitting signal during a light emitting period according to another embodiment of the present disclosure. In the embodiment, the light emitting brightness of the light emitting element D increases, and the pulse-off durations in the light emitting period sequentially increase. The embodiment shown in FIG. 12 differs from the embodiment shown in FIG. 8 in that, the pulse-on durations are constant, so that the cycles of the pulse signals sequentially increase, that is:

$$D_1-d_1=D_2-d_2= \ldots =D_n-d_n$$

$$D_1<D_2< \ldots <D_n$$

Figure 13:
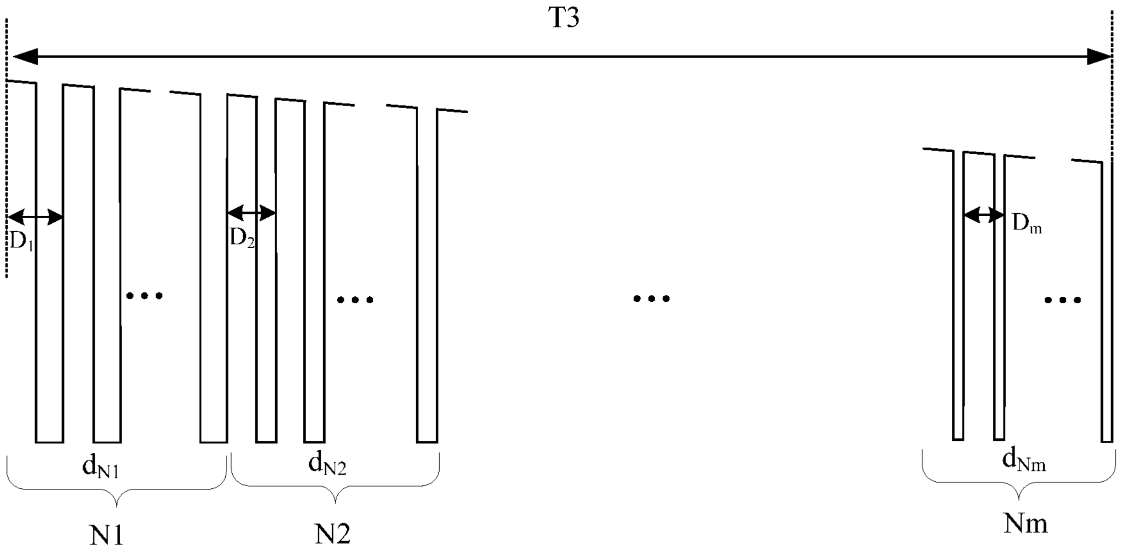
FIG. 13 shows a waveform diagram of a light emitting signal during a light emitting period according to another embodiment of the present disclosure.

Reference is made to FIG. 13, which shows a waveform diagram of a light emitting signal during a light emitting period according to another embodiment of the present disclosure. In the embodiment, the light emitting brightness of the light emitting element D gradually decreases, the light emitting period T3 is divided into multiple sub-periods, the pulse-off durations in the same sub-period are identical to each other, and the pulse-off durations in different sub-periods sequentially decrease. The embodiment shown in FIG. 13 differs from the embodiment shown in FIG. 9 in that, the pulse-on durations in the same sub-period are identical to each other, the pulse-on durations in different sub-periods are identical to each other, and cycles of pulse signals in different sub-periods sequentially decrease, that is:

$$D_1-d_{N1}=D_2-d_{N2}= \ldots =D_m-d_{Nm},$$

$$D_1>D_2> \ldots >D_m$$

Figure 14:
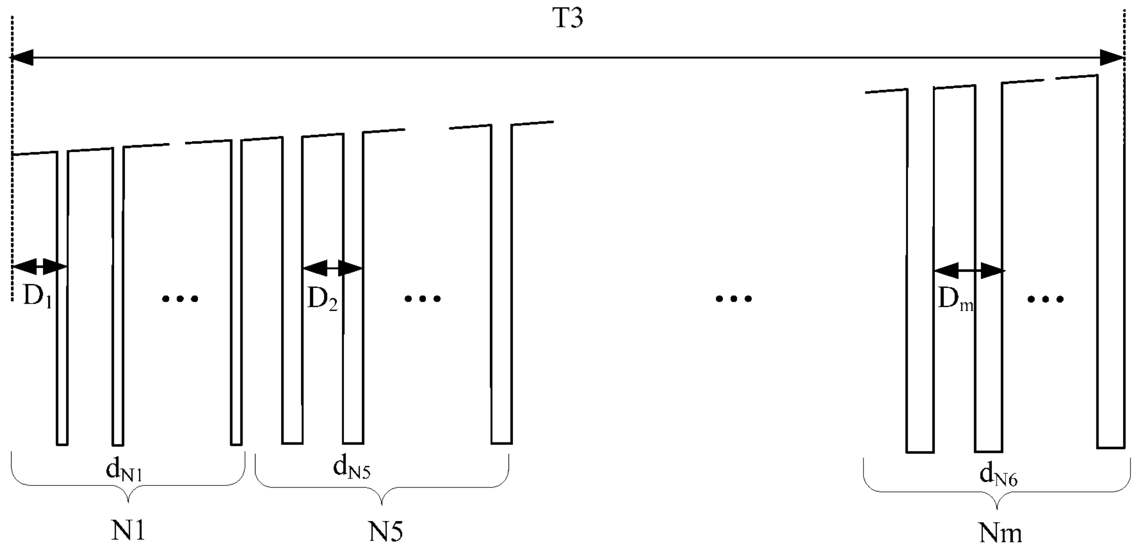
FIG. 14 shows a waveform diagram of a light emitting signal during a light emitting period according to another embodiment of the present disclosure.

Reference is made to FIG. 14, which shows a waveform diagram of a light emitting signal during a light emitting period according to another embodiment of the present disclosure. In the embodiment, the light emitting brightness of the light emitting element D gradually increases, the light emitting period T3 is divided into multiple sub-periods, the pulse-off durations in the same sub-period are identical to each other, and the pulse-off durations in different sub-periods sequentially increase. The embodiment shown in FIG. 14 differs from the embodiment shown in FIG. 10 in that, the pulse-on durations in the same sub-period are identical to each other, the pulse-on durations in different sub-periods are identical to each other, so that the cycles of the pulse signals sequentially increase, that is:

$$D_1-d_{N1}=D_2-d_{N2}= \ldots =D_m-d_{Nm}$$

$$D_1<D_2< \ldots <D_m$$

In an embodiment of the present disclosure, if pulse-off durations of two adjacent pulse signals are different from each other, the difference between the pulse-off durations is represented by $\Delta t$, which may be set according to requirements, and $\Delta t$ is positively correlated with the variation of the light emitting brightness of the light emitting element D. In one embodiment, during the light emitting period T3, if pulse-off durations of two adjacent pulse signals in the light emitting signal Emit are different from each other, a difference between the two pulse-off durations is positively correlated with the variation of the light emitting brightness of the light emitting element D. That is, a large variation of the light emitting brightness corresponds to a large difference, and a small variation of the light emitting brightness corresponds to a small difference, and effectively solving the flicker problem caused by a leakage current.

Figure 15:
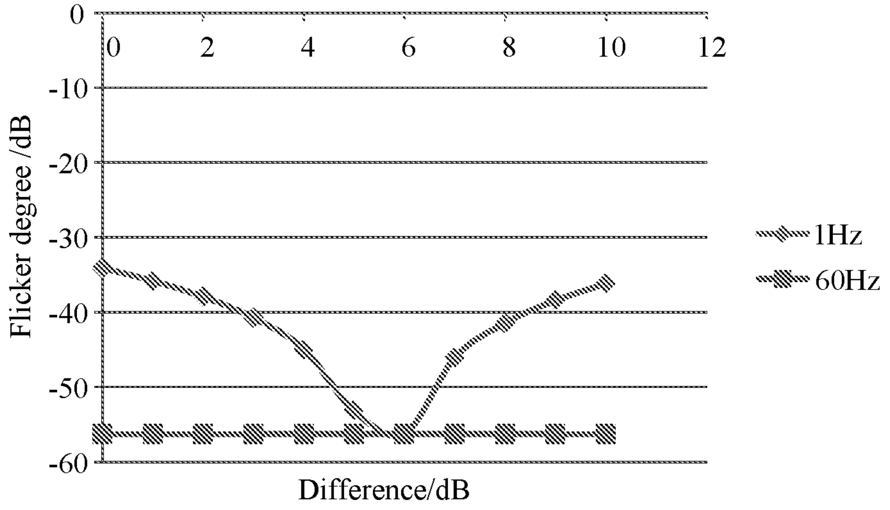
FIG. 15 is a graph showing a flicker degree varying with a difference between pulse-off durations according to an embodiment of the present disclosure.

Reference is made to FIG. 15, which is a graph of a flicker degree varying with a difference between pulse-off durations according to an embodiment of the present disclosure. As shown in FIG. 15, in a case that the frequency of the scan signal is 60 Hz, the flicker degree is small and constant; and in a case that the frequency of the scan signal is 1 Hz and the difference between pulse-off durations of two adjacent pulse signals ranges from 0 μs to 10 μs, the flicker degree decreases gradually first and then increases gradually. As shown in FIG. 15, during the light emitting period T3, if the pulse-off durations of adjacent pulse signals in the light emitting signal Emit are different from each other, and the difference between the pulse-off durations ranges from 5 μs to 7 μs, the flicker degree is small. In an embodiment, the difference is set to 5.8 μs, so that a smallest flicker degree can be achieved.

Figure 16:
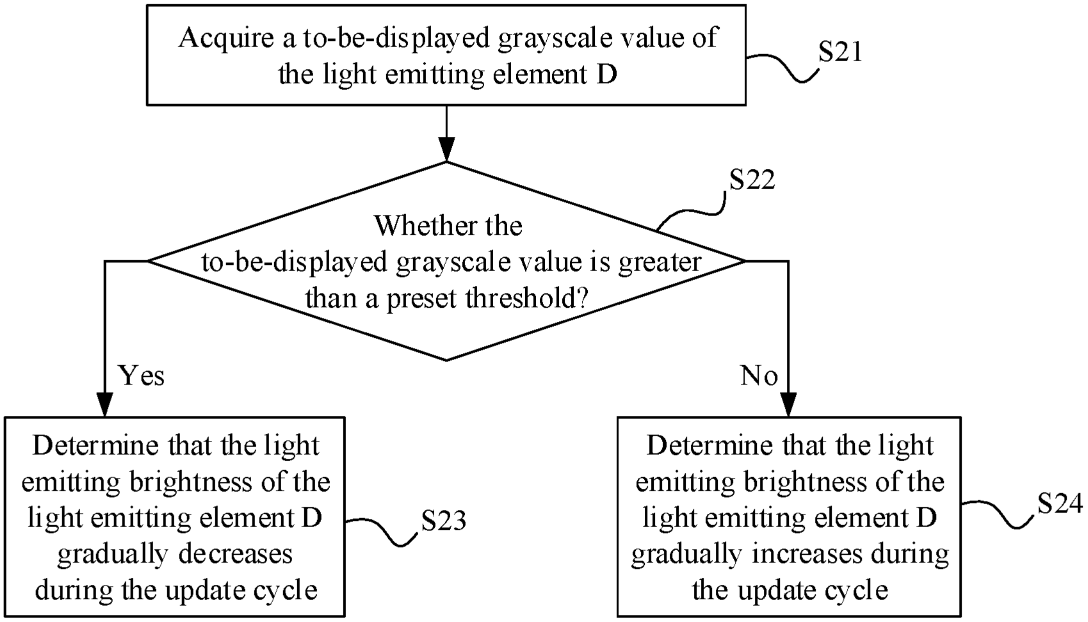
FIG. 16 shows a flow chart of a method for determining light emitting brightness of a light emitting element according to an embodiment of the present disclosure.

In the display driving method according to the embodiments of the present disclosure, the method for determining the light emitting brightness of the light emitting element D is as shown in FIG. 16. FIG. 16 shows a flow chart of a method for determining light emitting brightness of a light emitting element according to an embodiment of the present disclosure. The method includes following steps S21 to S24.

In step S21, a to-be-displayed grayscale value of the light emitting element D is acquired.

In step S22, it is determined whether the to-be-displayed grayscale value is greater than a preset threshold.

In step S23, if the to-be-displayed grayscale value is greater than the preset threshold, it is determined that the light emitting brightness of the light emitting element D gradually decreases during the update cycle.

In step S24, if the to-be-displayed grayscale value is less than or equal to the preset threshold, it is determined that the light emitting brightness of the light emitting element D gradually increases during the update cycle.

With the method shown in FIG. 16, the to-be-displayed grayscale value of the light emitting element D is directly acquired, and the variation trend of the light emitting brightness of the light emitting element can be determined simply and quickly based on a comparison result between the to-be-displayed grayscale value and the preset threshold.

In a display panel, due to the leakage current, the light emitting brightness of the light emitting element D may vary relative to required display brightness. It is found that if the to-be-displayed grayscale value of the light emitting element D is greater than a threshold, the light emitting brightness of the light emitting element D gradually decreases, and if the to-be-displayed grayscale value of the light emitting element D is less than the threshold, the light emitting brightness of the light emitting element D gradually increases. For different display panels, the thresholds are different. The threshold may be determined based on experiments and measurements, which is not limited in the embodiments of the present disclosure.

Based on the above description, it can be seen that the display driving method according to the embodiments of the present disclosure differs from the conventional display driving method in that, the variation trend of the pulse-off durations is consistent with the variation trend of the light emitting brightness of the light emitting element D during the light emitting period T3, that is, the pulse-off durations sequentially decrease with the decrease of the light emitting brightness of the light emitting element D or sequentially increase with the increase of the light emitting brightness of the light emitting element D, and solving the flicker problem in the display panel, thus improving the image display quality.

Figure 17:
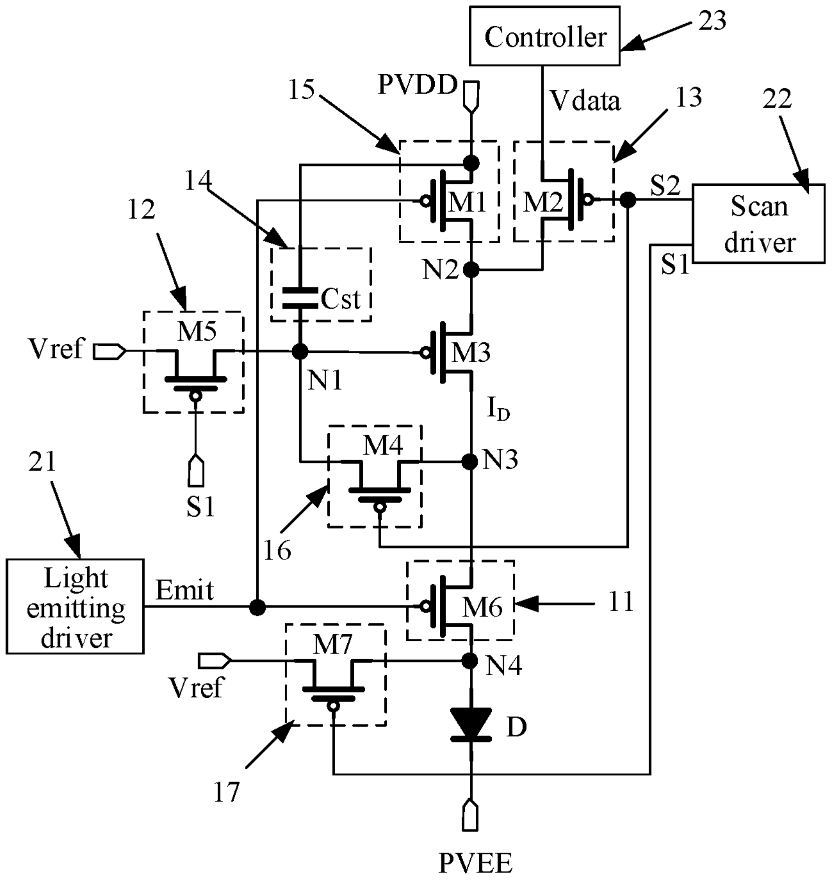
FIG. 17 is a schematic structural diagram of a display driving circuit according to an embodiment of the present disclosure.

Based on the above display driving method, a display driving circuit for a display panel is further provided according to another embodiment of the present disclosure. Reference is made to FIG. 17, which shows a schematic structural diagram of a display driving circuit according to an embodiment of the present disclosure.

The display panel includes a pixel circuit. The pixel circuit may include at least: a light emitting element D, a drive transistor M3, and a first control device 11 as described in the above embodiments. The light emitting element D is configured to emit light based on a driving current ID. The drive transistor M3 is configured to supply the driving current ID to the light emitting element D. The first control device 11 is configured to control a conduction state of a path between the drive transistor M3 and the light emitting element D in response to a light emitting signal Emit.

As shown in FIG. 17, the display driving circuit includes a light emitting driver 21. The light emitting driver 21 is configured to provide the light emitting signal Emit for the pixel circuit to control the light emitting element D in the pixel circuit to emit light. In one update cycle of the pixel unit, the light emitting signal Emit includes multiple pulse signals during a light emitting period T3, and a waveform diagram of the light emitting signal Emit may be as shown in FIG. 6. During the light emitting period T3, a variation trend of pulse-off durations is consistent with a variation trend of light emitting brightness of the light emitting element D.

The pixel circuit includes: a first reset device 12 and a data writing device 13. The first reset device 12 is configured to reset a voltage of a gate of the drive transistor M3 based on a first scan signal S1 and a reference voltage Vref. The data writing device 13 is configured to transmit a data signal Vdata to a first electrode of the drive transistor M3 based on a second scan signal S2. The driving current ID is outputted form a second electrode of the drive transistor M3.

As shown in FIG. 17, the display driving circuit further includes a scan driver 22. The scan driver 22 is configured to provide the first scan signal S1 and the second scan signal S2 for the pixel circuit. A frequency of the first scan signal S1 and a frequency of the second scan signal S2 are both smaller than a frequency of the light emitting signal Emit.

As shown in FIG. 17, the pixel circuit further includes a holding device 14, a second control device 15, a threshold compensation device 16, and a second reset device 17. The connection relationship of the devices is described above, which is not repeated herein.

If the light emitting brightness of the light emitting element D gradually decreases during the update cycle, the light emitting driver 21 is further configured to provide the pixel circuit with a light emitting signal Emit pulse-off durations of which sequentially decrease during the light emitting period T3. During the light emitting period T3, a pulse-off duration of a pulse signal in the light emitting signal Emit is not less than a pulse-off duration of a subsequent pulse signal in the light emitting signal Emit, and the light emitting signal Emit includes at least two pulse signals with different pulse-off durations.

If the light emitting brightness of the light emitting element D gradually increases during the update cycle, the light emitting driver 21 is further configured to provide the pixel circuit with a light emitting signal pulse-off durations of which sequentially increase during the light emitting period T3. During the light emitting period T3, a pulse-off duration of a pulse signal in the light emitting signal Emit is not greater than a pulse-off duration of a subsequent pulse signal in the light emitting signal Emit, and the light emitting signal Emit includes at least two pulse signals with different pulse-off durations.

The pulse-off durations in the same light emitting period T3 may sequentially change. In an embodiment, a difference between pulse-off durations of any two adjacent pulse signals may be constant during the light emitting period.

In an embodiment, the light emitting period may include multiple sub-periods. Multiple pulse signals may be emitted in each of the sub-periods. The pulse-off durations in the same sub-period may be identical to each other, and the pulse-off durations in different sub-periods may sequentially change. For any two adjacent sub-periods, a difference between pulse-off durations in the two adjacent sub-periods may be constant.

In the display driving circuit according to the embodiment of the present disclosure, for the multiple pulse signals in the light emitting period T3, the variation trend of the pulse-off durations is consistent with the variation trend of the light emitting brightness of the light emitting element D, a variation trend of the pulse-on durations is opposite to the variation trend of the light emitting brightness of the light emitting element D, so that pulse signals of the light emitting signal Emit in the light emitting period T3 have the same cycles. In one embodiment, for the multiple pulse signals in the light emitting period T3, the variation trend of the pulse-off durations is consistent with the variation trend of the light emitting brightness of the light emitting element D, the pulse-on durations are constant, and a variation trend of cycles of the pulse signals in the light emitting signal Emit during the light emitting period T3 is consistent with the variation trend of the light emitting brightness of the light emitting element D.

In the display driving circuit according to the embodiment of the present disclosure, during the light emitting period T3, if pulse-off durations of two adjacent pulse signals in the light emitting signal Emit are different from each other, a difference between the two pulse-off durations is positively correlated with a variation of the light emitting brightness of the light emitting element D. In one embodiment, during the light emitting period T3, if pulse-off durations of two adjacent pulse signals in the light emitting signal Emit are different from each other, a difference between the two pulse-off durations ranges from 5 μs to 7 μs.

As shown in FIG. 17, the display driving circuit further includes a controller 23. The controller 23 is configured to determine a variation of light emitting brightness of the light emitting element D by performing steps of: acquiring a to-be-displayed grayscale value of the light emitting element D; determining whether the to-be-displayed grayscale value is greater than a preset threshold; if the to-be-displayed grayscale value is greater than the preset threshold, determining that the light emitting brightness of the light emitting element D gradually decreases during the update cycle; and if the to-be-displayed grayscale value is less than or equal to the preset threshold, determining that the light emitting brightness of the light emitting element gradually increases during the update cycle. The controller 23 is further configured to provide a data signal Vdata.

The display driving circuit according to the embodiment of the present disclosure may be used to perform the above display driving method to solve the flicker problem in the display panel when emitting light, and improving the image display quality. For the implementation principle of the display driving circuit, reference may be made to the description of the display driving method.

Figure 18:
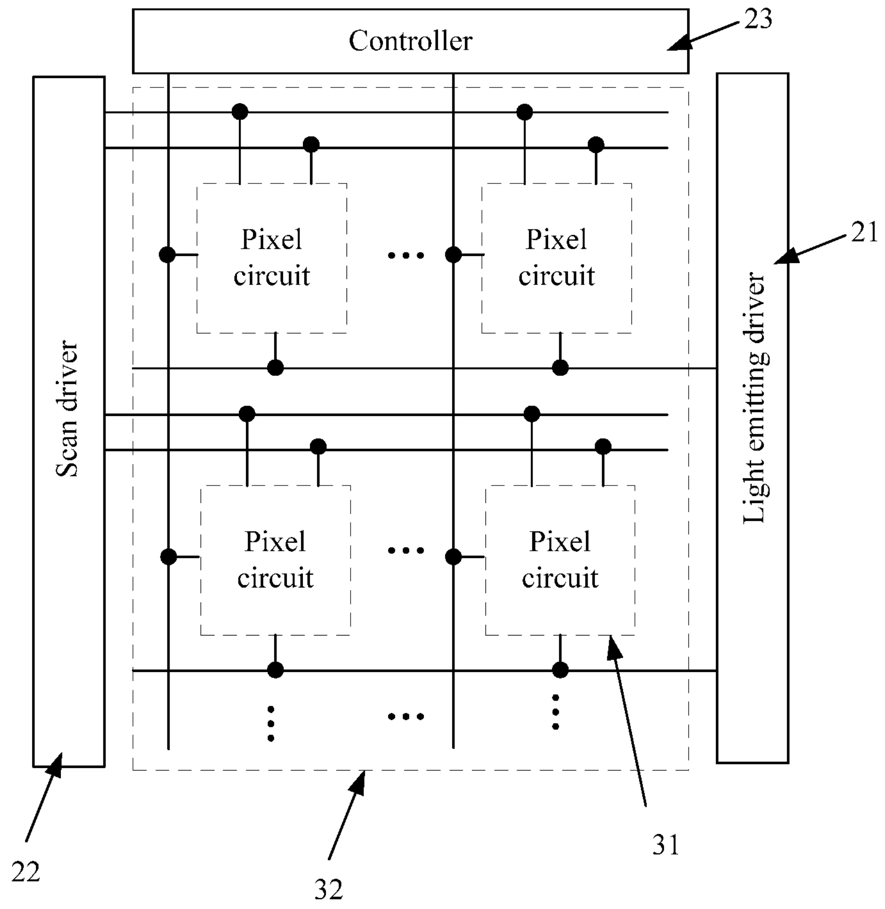
FIG. 18 is a schematic structural diagram of a display panel according to an embodiment of the present disclosure.

Based on the embodiments of the display driving circuit and the display driving method, a display panel is further provided according to another embodiment of the present disclosure. Reference is made to FIG. 18, which shows a schematic structural diagram of a display panel according to an embodiment of the present disclosure. The display panel includes multiple pixel units 31 and the display driving circuit described in the above embodiment.

As shown in FIG. 18, the display panel includes multiple pixel units 31 arranged in an array. Each of the multiple pixel units 31 includes a pixel circuit. The pixel circuit may have a structure described in the above embodiment. The pixel circuit includes at least: a light emitting element, a drive transistor, and a first control device. The light emitting element is configured to emit light based on a driving current. The drive transistor is configured to supply the driving current to the light emitting element. The first control device is configured to control a conduction state of a path between the drive transistor and the light emitting element in response to a light emitting signal.

As described in the above embodiment, the display driving circuit may include: a light emitting driver 21, a scan driver 22, and a controller 23. The light emitting driver 21 is configured to provide a light emitting signal. The scan driver 22 is configured to provide a first scan signal S1 and a second scan signal S2. The controller 23 is configured to provide a data signal Vdata and determine a variation of light emitting brightness of a light emitting element. The display panel has a display area 32. The pixel units are arranged in the display area 32. The controller 23, the scan driver 22, and the light emitting driver 21 are arranged in a frame region. The scan driver 22 and the light emitting driver 21 may be arranged in the frame region respectively at a left side and a right side of the display panel, or may be both arranged in the frame region at the left side of the display panel or in the frame region at the right side of the display panel. The controller 23 may be arranged in a frame region at an upper side or a lower side of the display panel.

The display panel according to the embodiments of the present disclosure includes the display driving circuit described above, which may be used to perform the above display driving method. The implementation principle of the display driving circuit is described in the above embodiments, which is not repeated herein. With the display panel, the flicker problem in the display panel when emitting light can be solved, and improving the image display quality.

In the present specification, the embodiments are described in a progressive manner, or a parallel manner, or a combination of progressive and parallel manner. Each of the embodiments mainly focuses on different embodiments from other embodiments, and reference can be made to these similar parts among the embodiments. Since the device disclosed in the embodiments corresponds to the method disclosed in the embodiments, the device is described relatively simply. For detailed description of the device, reference may be made to the related description of the method.

It should be noted that in the description of the present disclosure, it should be understood that the orientation or positional relationship indicated by the terms, such as "upper", "lower", "top", "bottom", "inner", "outer", is based on an orientation or positional relationship shown in the drawings, for the convenience of describing the present disclosure and simplifying the description, rather than indicating or implying that the referred device or element must have a specific orientation, be constructed and operated in a specific orientation. Therefore, these terms should not be understood as a limitation to the present disclosure. If a component is considered to be "connected" to another component, the component can be directly connected to another component or there may be a component arranged between the two components.

It should be noted that, in this context, relational terms such as first and second are used merely to distinguish one entity or operation from another entity or operation, and do not necessarily require or imply any such actual relationship or order between these entities or operations. The term "including", "comprising" or any other variations thereof are intended to cover a non-exclusive inclusion, thus an item or apparatus including a series of elements includes not only those elements, but also other elements not explicitly listed, or elements inherent in such an item or apparatus. Without further limitation, an element defined by the phrase "including a . . . " does not exclude the existence of additional identical elements in the item or apparatus including the element.

What is claimed is:

1. A display driving method for a display panel, wherein the display panel comprises a pixel unit, and the pixel unit comprises a pixel circuit, the pixel circuit comprising:

a light emitting element configured to emit light based on a driving current, a drive transistor configured to supply a driving current to the light emitting element, and a first control device configured to control a conduction state of a path between the drive transistor and the light emitting element in response to a light emitting signal, the display driving method comprising:

providing the pixel circuit with the light emitting signal, to enable the light emitting element in the pixel circuit to emit light, wherein during an update cycle, a picture update cycle or a data signal update cycle of the pixel unit, the light emitting signal comprises at least one pulse signal, the at least one pulse signal has a pulse-off duration and a pulse-on duration, and if the light emitting brightness of the light emitting element decreases, pulse-off durations of pulse signals of the light emitting signal decrease, and the light emitting brightness of the light emitting element increases, pulse-off durations of pulse signals of the light emitting signal increase, and the light emitting signal has a high level during the pulse-on duration of the at least one pulse signal and has a low level during the pulse-off duration of the at least one pulse signal.

2. The display driving method according to claim 1, wherein the pixel circuit further comprises:

a first reset device configured to reset a voltage of a gate of the drive transistor based on a first scan signal and a reference voltage; and a data writing device configured to transmit a data signal to a first electrode of the drive transistor based on a second scan signal, wherein the driving current is outputted from a second electrode of the drive transistor, and at least one of a frequency of the first scan signal and a frequency of the second scan signal is smaller than a frequency of the light emitting signal.

3. The display driving method according to claim 1, wherein if the light emitting brightness of the light emitting element gradually decreases during the update cycle, a pulse-off duration of a pulse signal of the light emitting signal is not less than a pulse-off duration of a subsequent pulse signal of the light emitting signal, and the light emitting signal comprises at least two pulse signals with different pulse-off durations; and if the light emitting brightness of the light emitting element gradually increases during the update cycle, a pulse-off duration of a pulse signal of the light emitting signal is not greater than a pulse-off duration of a subsequent pulse signal of the light emitting signal, and the light emitting signal comprises at least two pulse signals with different pulse-off durations.

4. The display driving method according to claim 1, wherein the drive transistor is a PMOS transistor.

5. The display driving method according to claim 4, wherein a difference between pulse-off durations of adjacent pulse signals is constant.

6. The display driving method according to claim 1, wherein a light emitting period of the pixel unit comprises more than one sub-period, a plurality of pulse signals is emitted in the more than one sub-period, wherein pulse-off durations of the pulse signals in the same sub-period are identical to each other, and pulse-off durations of pulse signals in different sub-periods change sequentially.

7. The display driving method according to claim 6, wherein a difference between a pulse-off duration in a sub-period and a pulse-off duration in an adjacent sub-period is constant.

8. The display driving method according to claim 1, wherein the variation trend of the pulse-off durations of the pulse signals is consistent with the variation trend of the light emitting brightness of the light emitting element, and wherein pulse-on durations of the pulse signals of the light emitting signal are constant, and a variation trend of cycles of the pulse signals of the light emitting signal is consistent with the variation trend of the light emitting brightness of the light emitting element; or a variation trend of pulse-on durations of the pulse signals is opposite to the variation trend of the light emitting brightness of the light emitting element, and the pulse signals of the light emitting signal has a same cycle.

9. The display driving method according to claim 1, wherein for adjacent pulse signals in the light emitting signal that have different pulse-off durations, a difference between the pulse-off durations of the adjacent pulse signals is positively correlated with a variation of the light emitting brightness of the light emitting element during the update cycle.

10. The display driving method according to claim 1, wherein if pulse-off durations of adjacent pulse signals of the light emitting signal are different from each other, a difference between two pulse-off durations ranges from 5 μs to 7 μs.

11. The display driving method according to claim 1, wherein the variation trend of the light emitting brightness of the light emitting element is determined by:

acquiring a to-be-displayed grayscale value of the light emitting element;

determining whether the to-be-displayed grayscale value is greater than a preset threshold;

if the to-be-displayed grayscale value is greater than the preset threshold, determining that the light emitting brightness of the light emitting element gradually decreases during the update cycle; and if the to-be-displayed grayscale value is less than or equal to the preset threshold, determining that the light emitting brightness of the light emitting element gradually increases during the update cycle.

12. A display driving method for a display panel, wherein the display panel comprises a pixel unit, and the pixel unit comprises a pixel circuit, the pixel circuit comprising:

a light emitting element configured to emit light based on a driving current, a drive transistor configured to supply a driving current to the light emitting element, and a first control device configured to control a conduction state of a path between the drive transistor and the light emitting element in response to a light emitting signal, the display driving method comprising:

providing the pixel circuit with the light emitting signal, to enable the light emitting element in the pixel circuit to emit light, wherein the light emitting signal comprises at least one pulse signal, the at least one pulse signal has a pulse-off duration and a pulse-on duration, the pulse-off duration comprises a first duration and a second duration, and a light emitting brightness of the light emitting element comprises a first light emitting brightness and a second light emitting brightness, and wherein the first duration is greater than the second duration, and the first light emitting brightness is greater than the second light emitting brightness, the first duration corresponds to the first light emitting brightness, and the second duration corresponds to the second light emitting brightness, and the light emitting signal has a high level during the pulse-on duration of the at least one pulse signal and has a low level during the pulse-off duration of the at least one pulse signal.

13. The display driving method according to claim 12, wherein the pixel circuit further comprises:

a first reset device configured to reset a voltage of a gate of the drive transistor based on a first scan signal and a reference voltage; and a data writing device configured to transmit the data signal to a first electrode of the drive transistor based on a second scan signal, wherein the driving current is outputted from a second electrode of the drive transistor, and at least one of a frequency of the first scan signal and a frequency of the second scan signal is smaller than a frequency of the light emitting signal.

14. The display driving method according to claim 12, wherein the drive transistor is a PMOS transistor.

15. A display driving method for a display panel, wherein the display panel comprises a pixel unit, and the pixel unit comprises a pixel circuit, the pixel circuit comprising:

a light emitting element configured to emit light based on a driving current, a drive transistor configured to supply a driving current to the light emitting element, and a first control device configured to control a conduction state of a path between the drive transistor and the light emitting element in response to a light emitting signal, the display driving method comprising:

providing the pixel circuit with the light emitting signal, to enable the light emitting element in the pixel circuit to emit light, wherein the light emitting signal comprises at least one pulse signal, the at least one pulse signal has a pulse-off duration and a pulse-on duration, the pulse-off duration comprises a first duration and a second duration, and a light emitting brightness of the light emitting element comprises a first light emitting brightness and a second light emitting brightness, and wherein the first duration is greater than the second duration, and the first light emitting brightness is greater than the second light emitting brightness, the first duration corresponds to the first light emitting brightness, and the second duration corresponds to the second light emitting brightness, the light emitting signal has a high level during the pulse-on duration of the at least one pulse signal and has a low level during the pulse-off duration of the at least one pulse signal, and a frequency of the light emitting signal is greater than a data signal update frequency.

16. A display driving circuit for a display panel, wherein the display panel comprises a pixel unit, and the pixel unit comprises a pixel circuit, the pixel circuit comprising:

a light emitting element configured to emit light based on a driving current, a drive transistor configured to supply a driving current to the light emitting element, and a first control device configured to control a conduction state of a path between the drive transistor and the light emitting element in response to a light emitting signal, the display driving circuit comprises a light emitting driver configured to provide the pixel circuit with the light emitting signal, to enable the light emitting element in the pixel circuit to emit light, wherein during an update cycle, a picture update cycle or a data signal update cycle of at least one of the pixel units, the light emitting signal comprises at least one pulse signal, the at least one pulse signal has a pulse-off duration and a pulse-on duration, and if the light emitting brightness of the light emitting element decreases, pulse-off durations of pulse signals of the light emitting signal decrease, and the light emitting brightness of the light emitting element increases, pulse-off durations of pulse signals of the light emitting signal increase, and the light emitting signal has a high level during the pulse-on duration of the at least one pulse signal and has a low level during the pulse-off duration of the at least one pulse signal.

17. The display driving circuit according to claim 16, wherein the pixel circuit further comprises:

a first reset device configured to reset a voltage of a gate of the drive transistor based on a first scan signal and a reference voltage;

a data writing device configured to transmit a data signal to a first electrode of the drive transistor based on a second scan signal, wherein the driving current is outputted from a second electrode of the drive transistor; and a scan driver configured to provide the first scan signal and the second scan signal to the pixel circuit, wherein at least one of a frequency of the first scan signal and a frequency of the second scan signal is smaller than a frequency of the light emitting signal.

18. The display driving circuit according to claim 16, wherein if the light emitting brightness of the light emitting element gradually decreases during the update cycle, a pulse-off duration of a pulse signal of the light emitting signal is not less than a pulse-off duration of a subsequent pulse signal of the light emitting signal, and the light emitting signal comprises at least two pulse signals with different pulse-off durations; and if the light emitting brightness of the light emitting element gradually increases during the update cycle, a pulse-off duration of a pulse signal of the light emitting signal is not greater than a pulse-off duration of a subsequent pulse signal of the light emitting signal, and the light emitting signal comprises at least two pulse signals with different pulse-off durations.

19. The display driving circuit according to claim 18, wherein the drive transistor is a PMOS transistor.

20. The display driving circuit according to claim 19, wherein a difference between pulse-off durations of adjacent pulse signals is identical to one another.

21. The display driving circuit according to claim 18, wherein a light emitting period of the pixel unit comprises more than one sub-period, a plurality of pulse signals is emitted in the more than one sub-period, wherein pulse-off durations of the pulse signals in the same sub-period are identical to each other, and pulse-off durations of pulse signals in different sub-periods change sequentially.

22. The display driving circuit according to claim 21, wherein a difference between a pulse-off duration in a sub-period and a pulse-off duration in an adjacent sub-period is identical to one-another.

23. The display driving circuit according to claim 18, wherein the variation trend of the pulse-off durations of the pulse signals is consistent with the variation trend of the light emitting brightness of the light emitting element, and wherein pulse-on durations of the pulse signals of the light emitting signal are constant, and a variation trend of cycles of the pulse signals of the light emitting signal is consistent with the variation trend of the light emitting brightness of the light emitting element; or a variation trend of pulse-on durations of the pulse signals is opposite to the variation trend of the light emitting brightness of the light emitting element, and the pulse signals of the light emitting signal has a same cycle.

24. The display driving circuit according to claim 16, wherein for adjacent pulse signals in the light emitting signal that have different pulse-off durations, a difference between pulse-off durations of the adjacent pulse signals is positively correlated with a variation of the light emitting brightness of the light emitting element during the update cycle.

25. The display driving circuit according to claim 16, wherein if pulse-off durations of adjacent pulse signals of the light emitting signal are different from each other, a difference between two pulse-off durations ranges from 5 μs to 7 μs.

26. A display driving circuit for a display panel, wherein the display panel comprises a pixel unit, and the pixel unit comprises a pixel circuit, the pixel circuit comprising:

a light emitting element configured to emit light based on a driving current, a drive transistor configured to supply a driving current to the light emitting element, and a first control device configured to control a conduction state of a path between the drive transistor and the light emitting element in response to a light emitting signal, the display driving circuit comprises a light emitting driver configured to provide the pixel circuit with the light emitting signal, to enable the light emitting element in the pixel circuit to emit light, wherein the light emitting signal comprises at least one pulse signal, the at least one pulse signal has a pulse-off duration and a pulse-on duration, the pulse-off duration comprises a first duration and a second duration, and a light emitting brightness of the light emitting element comprises a first light emitting brightness and a second light emitting brightness, and wherein the first duration is greater than the second duration, and the first light emitting brightness is greater than the second light emitting brightness, the first duration corresponds to the first light emitting brightness, and the second duration corresponds to the second light emitting brightness, and the light emitting signal has a high level during the pulse-on duration of the at least one pulse signal and has a low level during the pulse-off duration of the at least one pulse signal.

27. The display driving circuit according to claim 26, wherein the pixel circuit further comprises:

a first reset device configured to reset a voltage of a gate of the drive transistor based on a first scan signal and a reference voltage;

a data writing device configured to transmit the data signal to a first electrode of the drive transistor based on a second scan signal, wherein the driving current is outputted from a second electrode of the drive transistor; and a scan driver configured to provide the first scan signal and the second scan signal to the pixel circuit, wherein at least one of a frequency of the first scan signal and a frequency of the second scan signal is smaller than a frequency of the light emitting signal.

28. A display driving circuit for a display panel, wherein the display panel comprises a pixel unit, and the pixel unit comprises a pixel circuit, the pixel circuit comprising:

a light emitting element configured to emit light based on a driving current, a drive transistor configured to supply a driving current to the light emitting element, and a first control device configured to control a conduction state of a path between the drive transistor and the light emitting element in response to a light emitting signal, the display driving circuit comprises a light emitting driver configured to provide the pixel circuit with the light emitting signal, to enable the light emitting element in the pixel circuit to emit light, wherein the light emitting signal comprises at least one pulse signal, the at least one pulse signal has a pulse-off duration and a pulse-on duration, the pulse-off duration comprises a first duration and a second duration, and a light emitting brightness of the light emitting element comprises a first light emitting brightness and a second light emitting brightness, and wherein the first duration is greater than the second duration, and the first light emitting brightness is greater than the second light emitting brightness, the first duration corresponds to the first light emitting brightness, and the second duration corresponds to the second light emitting brightness, the light emitting signal has a high level during the pulse-on duration of the at least one pulse signal and has a low level during the pulse-off duration of the at least one pulse signal, and a frequency of the light emitting signal is greater than a data signal update frequency.

* * * * *